United States Patent [19]

Heaston et al.

[11] Patent Number: 5,748,422
[45] Date of Patent: May 5, 1998

[54] POWER LATCH CIRCUIT WITH OVERVOLTAGE PROTECTION

[75] Inventors: Bruce Allen Heaston, West Milton; Robert John Disser, Dayton, both of Ohio

[73] Assignee: General Motors Corporation, Detroit, Mich.

[21] Appl. No.: 724,989

[22] Filed: Oct. 3, 1996

[51] Int. Cl.$^6$ .................................................. H02H 7/00
[52] U.S. Cl. ................................................ 361/18; 361/101
[58] Field of Search ................................. 361/18, 91, 93, 361/100, 101; 323/282, 283, 284

[56] References Cited

U.S. PATENT DOCUMENTS

| | | |
|---|---|---|
| 4,685,023 | 8/1987 | Heaston ..................................... 361/88 |
| 4,899,098 | 2/1990 | Gariboldi ..................................... 361/18 |

*Primary Examiner*—Brian K. Young
*Assistant Examiner*—Sally C. Medley

*Attorney, Agent, or Firm*—Robert M. Sigler

[57] ABSTRACT

A power latch circuit for a computer is improved by the expansion of an activate control circuit to include overvoltage protection circuitry. The activate control circuit is responsive to either an activate input circuit or a feedback latch circuit to activate an activating transistor which in turn activates a series transistor providing power from a DC electric power source through a voltage regulating circuit to the computer, which is programmed to turn itself off by activating a deactivate transistor to deactivate the activating and series transistors. In the improved circuit, the activate control circuit includes elements for activating the activating transistor and series transistor in a switching mode when the output voltage of the series transistor does not exceed a fixed limit voltage and in a voltage regulating mode when the output voltage of the series transistor exceeds the fixed limit voltage, whereby an increase in the output voltage of the series transistor beyond the fixed limit voltage is reduced. The activate control circuit further deactivates a hold-off transistor during activation of the activating and series transistors, regardless of the mode of operation.

3 Claims, 1 Drawing Sheet

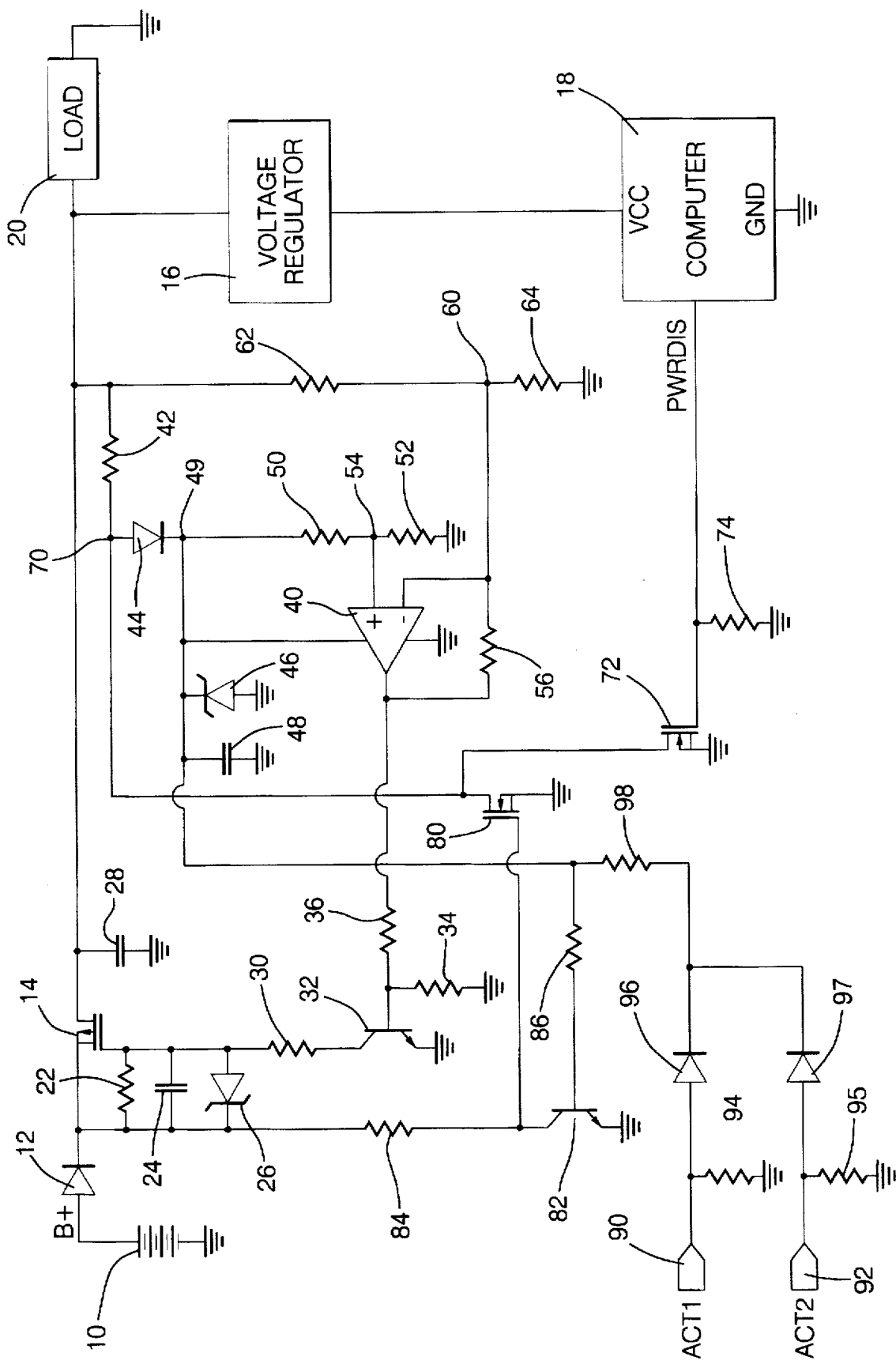

5,748,422

POWER LATCH CIRCUIT WITH OVERVOLTAGE PROTECTION

TECHNICAL FIELD

The technical field of this invention is power latch circuits for computers, and particularly those including overvoltage protection.

BACKGROUND OF THE INVENTION

U.S. Pat. No. 4,685,023 describes a power latch circuit for a computer 37 in which a transistor 71 is connected in series with a voltage regulating circuit 72 between the computer and a DC electric power source B+. An activation control circuit comprises a transistor 81 responsive to either of an actuate input voltage through diode 101 or a feedback latch voltage through voltage regulating circuit 72 and diode 95 to switch on and thus activate the series transistor 71, voltage regulating circuit 72 and computer 37. A deactivate terminal of the computer provides a signal, under computer control, to a transistor 86 to turn off transistor 81 and thus shut computer power off; and a FET 90 is controlled by the activation control circuit inversely with respect to transistor 81 to latch off transistor until the next valid actuate signal is received.

The power latch circuit may, however, be part of a larger circuit arrangement on a motor vehicle including one or more additional loads supplied with DC electric power through the series transistor; and higher voltages may occasionally be generated in the DC electric power, from which higher voltages the computer, the voltage regulating circuit or another load may require additional protection. This invention is directed to a modification of the arrangement shown in the above-identified patent which provides additional overvoltage protection while still performing its original functions.

SUMMARY OF THE INVENTION

The invention is an improved power latch circuit for a computer having a DC electric power source, a series transistor and a voltage regulating circuit connected in series with the computer to supply a regulated voltage thereto when the series transistor is activated. The power latch circuit further comprises an activate input circuit responsive to an activate input signal, a feedback latch circuit responsive to an output voltage of the series transistor, an activate control circuit comprising an activating transistor connected to control the series transistor and responsive to activation of either of the activate input circuit and the feedback latch circuit to activate the activating transistor and thus the series transistor. The power latch circuit additionally comprises a deactivate transistor activatable by the computer to deactivate the feedback latch circuit and thus the series transistor and the computer, a hold-off transistor connected in parallel with the deactivate transistor and activated independently by the DC electric power source, and a hold-off deactivate circuit responsive to the activate control circuit to deactivate the hold-off transistor in response to activation of either of the activate input circuit and the feedback latch circuit.

The improvement is found in the activate control circuit, which comprises means for activating the activating transistor and series transistor in a switching mode when the output voltage of the series transistor does not exceed a fixed limit voltage and in a voltage regulating mode when the output voltage of the series transistor exceeds the fixed limit voltage. In switching mode, the series transistor operates as in the circuit of the prior art; however, in voltage regulating mode, the series transistor generates a voltage drop sufficient to keep the output voltage of the series transistor very near the limit voltage and thus protects the voltage regulating circuit, the computer and any additional loads from overvoltages appearing in the DC electric power supply.

Preferably, the activate control circuit comprises an operational amplifier having a first input terminal provided with a predetermined percentage of the fixed limit voltage, a second input terminal provided with a predetermined percentage of the output voltage of the series transistor and an output terminal coupled to a control terminal of the activating transistor. The activating transistor will thus be controlled in switching or voltage regulating mode by the output of the operational amplifier.

Preferably, the activate input circuit, the feedback latch circuit, the deactivate transistor and the hold-off transistor are all coupled to a common circuit junction of the activation control circuit; and the common circuit junction has connected thereto: (1) a zener diode limiting the voltage on the common circuit junction to a predetermined voltage related to the fixed limit voltage, (2) an operating power input terminal of the operational amplifier, and (3) a voltage divider providing the predetermined percentage of the fixed limit voltage to the first input terminal of the operational amplifier. Thus, when sufficient voltage is provided across the zener diode by the activate input circuit or the feedback latch circuit, the zener diode determines both the operating voltage of the operational amplifier and the predetermined percentage of the fixed limit voltage provided to the first input of the operational amplifier.

Preferably, the series transistor is a p-channel FET referenced to a positive terminal of the DC electric power source, the operational amplifier is referenced to a ground terminal of the DC electric power source, and the activating transistor is an NPN bipolar transistor acting as a voltage level shifter therebetween.

Preferably, the activation control circuit comprises an additional transistor activated by either of the activate input circuit and the feedback latch circuit to maintain the hold-off transistor deactivated when the activating transistor is activated, either in switching mode or voltage regulating mode.

BRIEF DESCRIPTION OF THE DRAWINGS

The single figure shows a preferred embodiment of the invention in circuit diagram form.

DESCRIPTION OF THE PREFERRED EMBODIMENT

A DC electric power source 10 may typically be a motor vehicle power supply, including a battery, an engine driven alternator and a voltage regulator. Although nominally providing a regulated voltage, DC electric power source 10 may be subject to a significant load and/or temperature variation in voltage when operating on the battery and is further subject to higher voltage spikes from load dump and/or other occasional events. DC electric power source 10 has a positive terminal B+ and a ground terminal as indicated; and a diode 12 (1N5822) has an anode connected to positive terminal B+. A series transistor, preferably a p-channel power FET 14 (MTP23P06) has a source terminal connected to the cathode of diode 12 and a drain terminal connected to the input of a voltage regulator circuit 16. The output of voltage regulator circuit 16 provides a regulated positive 5 volts to the VCC terminal of a computer 18, which has a ground terminal GND connected to the ground terminal of DC electric power source 10. The drain of FET 14 may be additionally connected through one or more additional load circuits in parallel, symbolized by LOAD 20, to the ground terminal of DC electric power source 10. FET 14 thus controls the application of power from DC electric power source 10 to computer 18 and LOAD 20. A biasing resistor 22 (4.7K) is connected across the source and gate terminals of FET 14. A capacitor 24 (10 nF) and protective zener diode 26 (1N4745A) are connected across resistor 22; and an electrolytic filter capacitor 28 (220 µF) is connected from the drain of FET 14 to ground.

When the voltage on the gate terminal of FET 14 is sufficiently below that on the source terminal, FET 14 will conduct current from DC electric power source 10 to voltage regulator circuit 16; and this conduction may be in either of two modes well known in the art. In the first mode, the voltage on the gate terminal is well below that on the source terminal; and the operating point of FET 14 is in its ohmic region. In this mode, the resistance of FET 14, and therefore the voltage drop across it, is very small. Power dissipation in FET 14 is thus low; and this is the preferred mode of operation for switching applications; thus, this mode will be referred to as switching mode in this description. However, when FET 14 is activated in the first mode, the voltage at its drain terminal, which is provided to voltage regulator 16 and load 20, is maintained less than a volt below that at its source terminal; and any overvoltage in DC electric power source 10 applied to the source terminal of FET 14 is passed right through FET 14 to voltage regulator 16 and load 20.

In the second mode, the voltage on the gate terminal of FET 14 is much closer to that on the source terminal; and the operating point of FET 14 is in its active region. In this mode, power dissipation is higher; but the drain/source voltage drop across FET 14 is proportional to the gate/source voltage; and the drain or output voltage of FET 14 may thus be fed back to control the operating point thereof so as to prevent the drain voltage from significantly exceeding a fixed limit voltage. It is the purpose of this circuit to normally operate FET 14 in switching mode but to automatically change this operation to the second mode, which will be referred to as voltage regulating mode, when required to limit the voltage provided from DC electric power source 10 through FET 14 to voltage regulator 16, computer 18 and load 20.

The gate terminal of FET 14 is connected through a resistor 30 (820 ohm, ¼ watt) to the collector of a bipolar NPN transistor 32 (MMBT101) having a grounded emitter and a base connected to ground through a biasing resistor 34 (4.7K). Another resistor 36 (1K) has one end connected to the base of transistor 32 and thus forms a voltage divider with resistor 34 to determine the proportion of the voltage applied across both resistors in series which is provided to the base of transistor 32. Transistor 32 may be referred to as an activating transistor, since it controls the activation of series FET 14. An operational amplifier 40 (MC33072) is provided with operating power from FET 14 through a resistor 42 (220 ohm) and a diode 44 (GL34G). A zener diode 46 (1N4733A) with a parallel capacitor 48 (0.1 µF) limits the voltage at the junction 49 of diode 44 and thus establishes a predetermined voltage to be applied as the operating voltage of operational amplifier 40 as well as the voltage across a series pair of resistors 50 (1.50K, 1%) and 52 (1.00K, 1%) connected in a voltage divider between diode 44 and ground. The junction 54 of resistors 50 and 52 is connected to the non-inverting input of operational amplifier 40 and thus provides a constant reference voltage thereto, which voltage is a predetermined percentage of the predetermined voltage across zener diode 46. The inverting input of operational amplifier 40 is connected through a feedback resistor 56 (10.0K, 1%) to the output thereof, the latter being connected to the other end of resistor 36. Operational amplifier 40 thus provides the voltage across the voltage divider comprising resistors 36 and 34 which determines the operating point of transistor 32 and thus of FET 14. The inverting input of operational amplifier 40 is connected to the junction 60 of a pair of resistors 62 (2.80K, 1%) and 64 (357 ohm, 1%) forming a voltage divider from the drain of FET 14 to ground; and the inverting input is thus provided with a voltage comprising a predetermined percentage of the voltage at the drain of FET 14. Elements 30–64, together with a few elements yet to be described, comprise an activation control circuit which controls the activation and mode of activation of series FET 14. In addition, the comparatively low series resistance of resistors 62 and 64 provides a convenient discharge path for capacitor 28 and other filter capacitors in LOAD 20 when the FET 14 is deactivated.

The junction 70 of resistor 42 and diode 44 is connected to the drain of an n-channel FET 72 (2N7002) having a grounded source and a gate connected to ground through a biasing resistor 74 (4.7K) and to an output terminal of computer 18. Computer 18 is programmed to provide a voltage signal PWRDIS on this output, which signal is normally low during computer operation but is switched high and turns on FET 72 when computer 18 decides to turn itself off. FET 72 thus serves as a deactivation transistor for transistor 32, FET 14 and computer 18. Junction 70 is further connected to the drain of another n-channel FET 80 (2N7002) having a grounded source and a gate connected to the collector of an NPN bipolar transistor 82 (MMBT101). Transistor 82 is connected through a load resistor 84 (47K) to the source of FET 14; the emitter thereof is grounded; and the base thereof is connected through a resistor 86 (4.7K) to junction 49. FET 80 is a hold-off transistor used to prevent the undesired activation of computer 18 and is thus activated directly from DC electric power source 10 through resistor 84 as long as transistor 82 is deactivated. As in the prior art, the activation of FET 80 does not result in any significant power drain since, with FET 14 deactivated, FET 80 has no source of drain current once the capacitors are discharged and its gate terminal has extremely low leakage current. Transistor 82 and resistor 86 are an additional part of the activation control circuit mentioned above and in the claims; transistor 82 is needed to keep FET 80 deactivated when transistor 32 is activated, since the activation of transistor 32 is sometimes in the voltage regulating mode, in which mode transistor 32 could not itself maintain the deactivation of FET 80. Finally, a pair of activate signal terminals 90 and 92, connected to ground by resistors 94 and 95 (2.7K), respectively, are connected in a logical OR through diodes 96 and 97 (GL34G), respectively, and a common series resistor 98 (220 ohm) to junction 49. Terminals 90 and 92 are provided with activate signals ACT1 and ACT2, respectively, either of which is effective by itself to activate computer 18.

In operation, with computer 18 turned off, FET 80 is turned on through resistor 84; but no significant current flows, since all other transistors, including FET 14, are turned off and no operating power is provided to operational amplifier 40. FET 80 prevents transistor 32, and thus FET 14, from being activated by spurious voltages other than an activate signal voltage. An activate signal voltage (high) on either of terminals 90 and 92 is passed through the activation input circuit of elements 94–98 to turn on transistor 82, the latter turning off FET 80. The activate signal further provides a high voltage to junction 49 which is limited by zener diode 46 to the predetermined voltage which is provided as an operating voltage to operational amplifier 40 and to the voltage divider comprising resistors 50 and 52 which provide a predetermined reference voltage on the non-inverting input of operational amplifier 40. Since FET 14 is not yet conducting, no voltage is provided on the inverting input of operational amplifier 40; and the output thereof goes high to turn on bipolar transistor 32 in saturation. This pulls the gate of FET 14 very low to turn it on in switching mode; and FET 14 provides power from DC electric power source 10 to voltage regulator 16 and thus to computer 18, which wakes up and begins to run its operating program. FET 14 further provides power to load 20 and a latching voltage through the feedback latching circuit of resistor 42 and diode 44 to junction 49, which latching voltage latches power to operational amplifier 40. Assuming that the drain or output voltage of FET 14 is less than a fixed limit voltage of 15–17 volts, the voltage divider of resistors 62 and 64 provides a voltage on the inverting input of operational amplifier 40 which is significantly less than the fixed voltage on the non-inverting input thereof; and transistor 32 is thus maintained in saturation. Thus, both transistor 32 and FET 14 are latched in an activated state; and transistor 82 is latched to maintain FET 80 deactivated. As soon as the latching voltage is established, the activate signal may cease; and the circuit will remain latched with computer 18 operating. When computer 18 decides to end its operation, it provides a high output PWRDIS signal to turn on FET 72 and thus pull the voltage on junction 70 to ground. This reverse biases diode 44 to remove operating power from operational amplifier 40; and transistor 32 and FET 14 thus turn off to remove power from computer 18 and load 20. In addition, transistor 82 is deprived of base current; and FET 80 is thus allowed to turn on and latch the system off.

In the operation described in the preceding paragraph, FET 14 is operated in switching mode and the circuit operates substantially the same as that of U.S. Pat. No. 4,685,023 described above. A comparison can be made between the transistors of this circuit and that of the prior art patent. For example, FET 14 of this circuit corresponds to transistor 71 of the prior art patent; FET 72 of this circuit corresponds to transistor 86 of the prior art patent; and FET 80 of this circuit corresponds to FET 90 of the prior art patent. However, the dual functions performed by transistor 81 of the prior art patent—controlling both FET 90 and transistor 71—have been separated in this circuit, with transistor 82 controlling FET 80 and transistor 32 controlling FET 14. This is due to the fact that, in the new circuit, bipolar transistor 82 must remain in saturation to continue to hold off FET 80 during the operation of computer 18 while transistor 32 is free to change the operation of FET 14 between switching and voltage regulating modes of operation, as will now be described.

The switching mode of operation of FET 14 as described above continues as long as the drain or output voltage of FET 14 is less than the aforementioned fixed limit voltage of 15–17 volts. The circuit is designed to prevent the drain voltage of FET 14 from significantly exceeding this fixed limit voltage by changing into voltage regulating mode of operation as necessary to drop the excess voltage across FET 14. A fixed percentage of the drain voltage of FET 14 is provided by the voltage divider comprising resistors 62 and 64 to the inverting input of operational amplifier 40. At the same time, a fixed reference voltage is provided by zener diode 46 and the voltage divider comprising resistors 50 and 52 to the non-inverting input of operational amplifier 40. In the switching mode of operation, the fixed reference voltage exceeds the selected proportion of the drain voltage of FET 14 by an amount which creates an output voltage sufficient to drive transistor 32 into saturation; and this pulls the gate voltage of FET 14 sufficiently low to operate FET 14 full on in the switching mode. The voltage value for zener diode 46 and the resistance values of the voltage dividers and resistors 34 and 36 are chosen so that, when an overvoltage condition causes the drain voltage of FET 14 to rise past the fixed limit voltage, the difference between the inverting and non-inverting inputs of operational amplifier 40 decreases and the output thereof decreases to allow transistor 32 to come out of saturation into its active region of operation. This allows the collector voltage of transistor 32 to rise sufficiently close to the source voltage of FET 14 that the latter enters its active region of operation. The drain/source voltage drop across FET 14 thus increases. Since the source of FET 14 is referenced to B +, this causes the drain voltage of FET 14 to decrease until an equilibrium is reached. Transistor 32 thus serves as a level shifter in the voltage regulating mode of operation to create a negative feedback loop in which an increase in the source voltage of FET 14 causes an increase in the drain/source voltage drop across FET 14 to prevent the drain voltage thereof from rising significantly above the fixed limit voltage. As the overvoltage condition eases and disappears, the operational amplifier causes transistor 32 to go back into saturation and return FET 14 to switching mode. Thus voltage regulator 16, computer 18 and load 20 are all protected from overvoltage conditions without affecting the other functions of the circuit.

In the embodiment shown, FET 14 is a MOSFET and transistor 32 is a bipolar transistor; however, these choices are not required. FET 14 could be replaced by any similar semiconductor device, such as an IGBT or bipolar power transistor, while bipolar transistor 32 could be replaced by a FET. The advantage of the embodiment shown is that FET 14 requires only a very small gate drive current, which can be supplied by an inexpensive, low power bipolar transistor as transistor 32. If FET 14 were replaced by a semiconductor device requiring a larger drive current, transistor 32 would need to be a slightly costlier device capable of supplying the larger drive current and dissipating the additional heat created.

We claim:

1. A power latch circuit for providing a regulated DC voltage from a DC electric power source to a computer, the power latch circuit comprising, in combination:

a series transistor and a voltage regulating circuit connected in series between the DC electric power source and the computer with the series transistor having an output terminal connected to the voltage regulating circuit to supply electric power therethrough and thus provide the regulated voltage to the computer when the series transistor is activated;

an activate input circuit activated by an activate input signal;

a feedback latch circuit activated by an output voltage of the series transistor;

an activate control circuit comprising an activating transistor connected to control the series transistor and responsive to activation of either of the activate input circuit and the feedback latch circuit to activate the activating transistor and thus the series transistor;

a deactivate transistor activatable by the computer in the absence of the activate input signal to deactivate the feedback latch circuit and thus also the activating transistor, the series transistor and the computer;

a hold-off transistor connected in parallel with the deactivate transistor, the hold-off transistor being separately activatable to prevent activation of the activating transistor in the absence of the activate input;

a hold-off deactivate circuit comprising an additional transistor not coupled to the activating transistor, the additional transistor being responsive to activation of either of the activate input circuit and the feedback latch circuit to maintain the hold-off transistor deactivated;

means for defining a fixed limit voltage; and the activate control circuit comprising means for activating the activating transistor and series transistor in a switching mode when the output voltage of the series transistor does not exceed the fixed limit voltage and in a voltage regulating mode when the output voltage of the series transistor exceeds the fixed limit voltage, whereby an increase in the output voltage of the series transistor beyond the fixed limit voltage is reduced.

2. The power latch circuit of claim 1 in which the activate control circuit comprises an operational amplifier having a first input terminal provided with a predetermined percentage of the fixed limit voltage, a second input terminal provided with a predetermined percentage of the output voltage of the series transistor and an output terminal coupled to a control terminal of the activating transistor and in which the activate input circuit, the feedback latch circuit, the deactivate transistor and the hold-off transistor are all coupled to a common circuit junction of the activate control circuit, the common circuit junction further having connected thereto: (1) a zener diode limiting the voltage on the common circuit junction to a predetermined voltage related to the fixed limit voltage, (2) an operating power input terminal of the operational amplifier, and (3) a voltage divider providing the predetermined percentage of the fixed limit voltage to the first input terminal of the operational amplifier.

3. The power latch circuit of claim 2 in which the series transistor is a p-channel FET referenced to a positive terminal of the DC electric power source, the operational amplifier is referenced to a ground terminal of the DC electric power source, and the activating transistor is an NPN bipolar transistor acting as a voltage level shifter therebetween.

* * * * *